Nov. 26, 1940.  A. P. FERGUESON  2,222,610
FENDER SHIELD AND MOUNTING
Filed Dec. 30, 1938  2 Sheets-Sheet 1
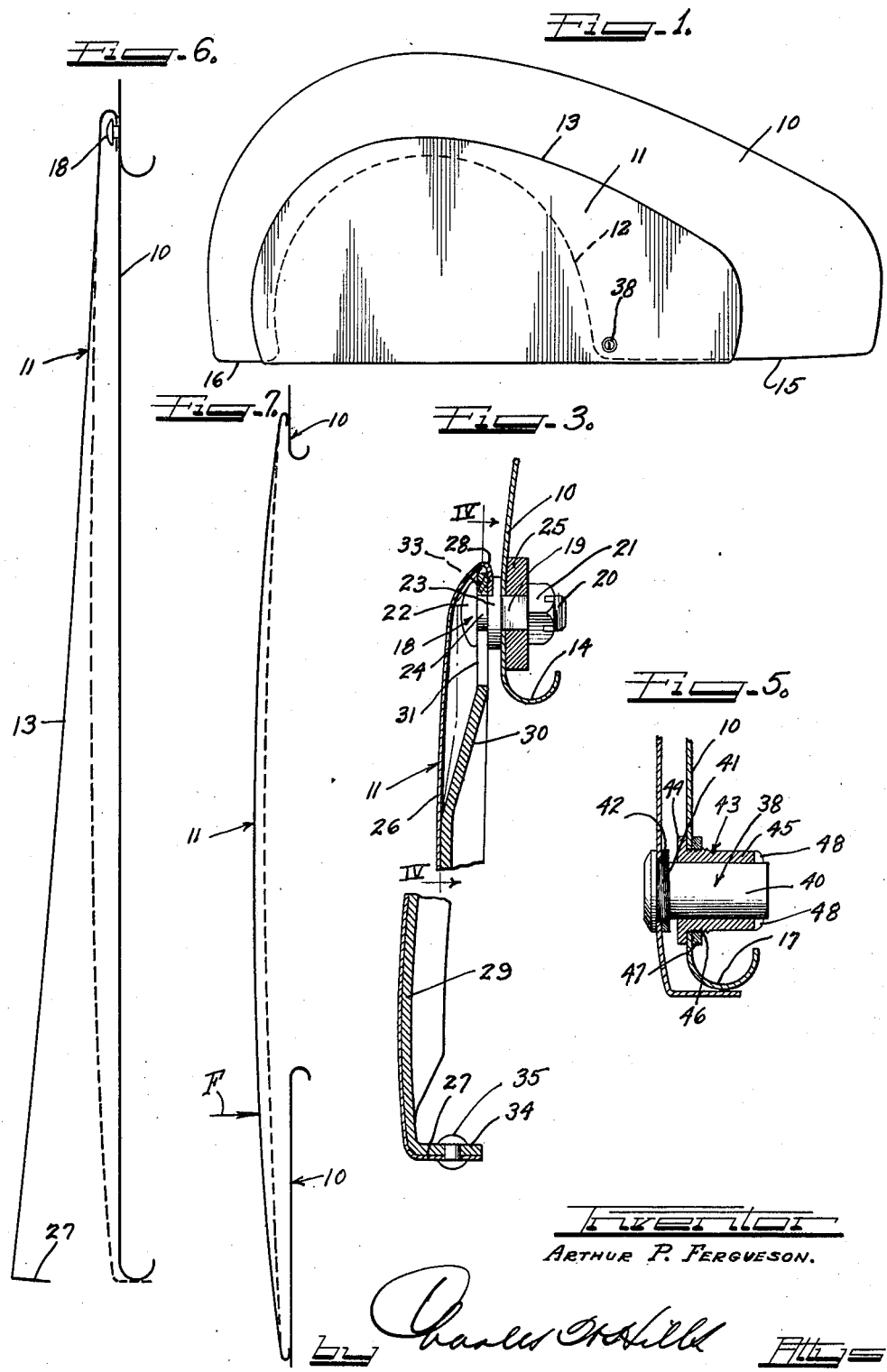
Inventor
ARTHUR P. FERGUESON.

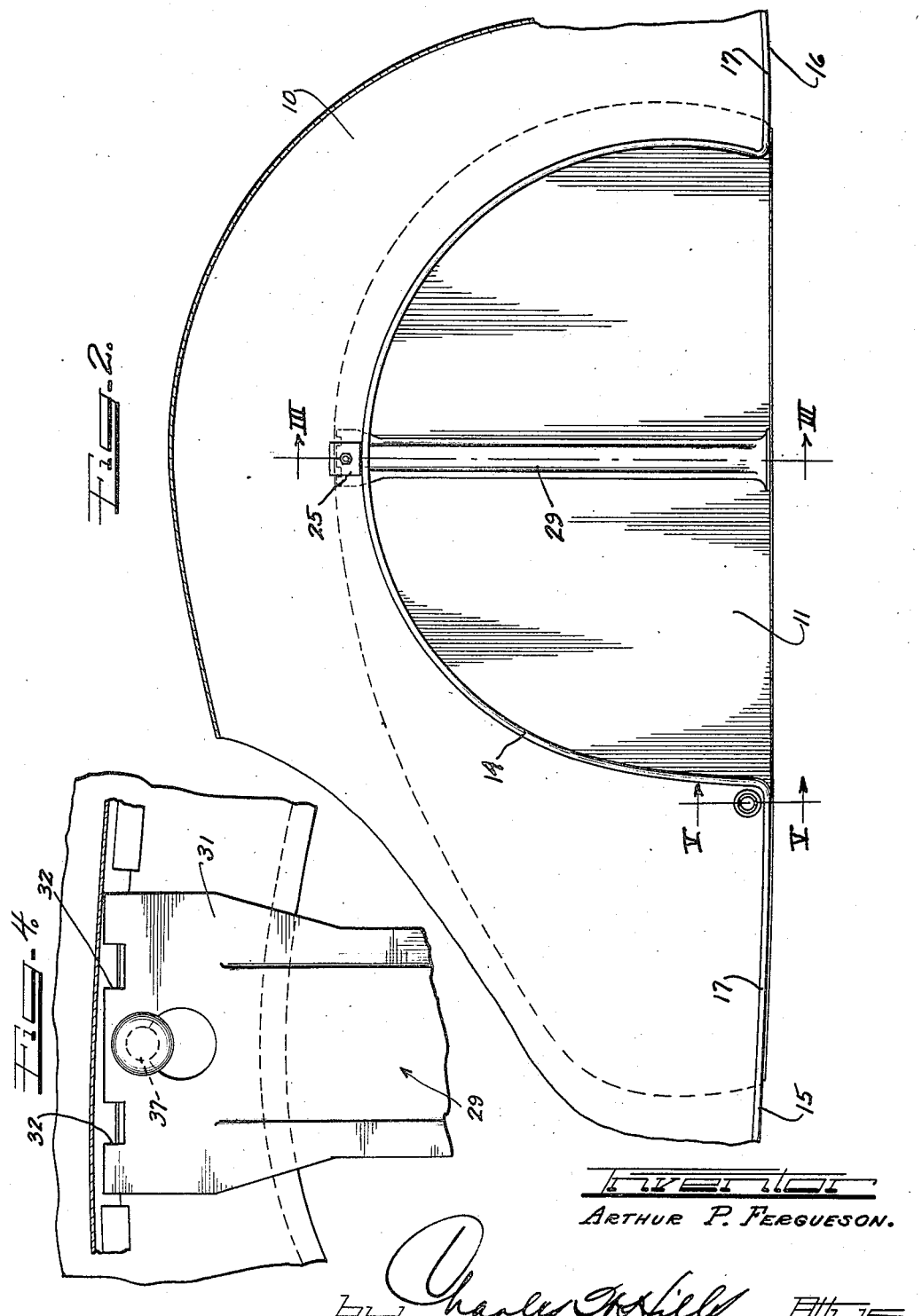

Patented Nov. 26, 1940

2,222,610

UNITED STATES PATENT OFFICE 2,222,610

FENDER SHIELD AND MOUNTING

Arthur P. Fergueson, Detroit, Mich., assignor to Houdaille-Hershey Corporation, Detroit, Mich., a corporation of Michigan Application December 30, 1938, Serial No. 248,390

3 Claims. (Cl. 280—153)

This invention relates to fender shields and fender shield assemblies, and more particularly to a fender shield of the type in which a fender shield is progressively wrapped into place on the vehicle fender by a compound flexing movement. This invention also relates to a novel supporting and mounting means for detachably securing a fender shield in desired position on a vehicle fender.

In the vehicle industry, and particularly in the automobile industry, various means have been utilized to improve the appearance of vehicle fenders. The usual vehicle fender is provided with an opening which affords access to the vehicle wheel, and which permits the ready removal of the wheel in an axial direction. Since this opening inherently presents an unattractive outward appearance, detachable fender shields have been employed to substantially cover this opening. As the term "fender shield" shall hereinafter be employed, it refers to any member which is adapted to be secured to a fender or other portion of a vehicel body for the purpose of covering the opening in the fender or vehicle body which is provided for access to or removal of the vehicle wheel.

It is an object of the present invention to provide a novel fender and fender shield assembly, or the like.

It is a further object of this invention to provide a novel fender shield including supporting and latching means which is economical to manufacture, and which is rugged and reliable in use.

It is a still further object of this invention to provide a novel combination of fender and fender shield wherein the fender shield is progressively wrapped into place as it is mounted on a vehicle fender by a compound flexing movement.

Another and further object of this invention is to provide a novel fender and fender shield assembly in which the fender shield is initially supported at its top and is then progressively wrapped or flexed around its curved edge downwardly towards its two lower corners and in which it is thereafter flexed in a plane transverse to the plane of the fender shield by an inward flexing of the base edge of the fender shield.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawings, in which:

Figure 1 is a front elevational view of a fender shield and fender assembly illustrating one embodiment of the present invention;

Figure 2 is an enlarged rear elevational view of the fender and fender shield assembly shown in Figure 1;

Figure 3 is an enlarged sectional view taken along the line III—III of Figure 2;

Figure 4 is a sectional view taken along the line IV—IV of Figure 3;

Figure 5 is an elevational view partly in cross-section of the locking mechanism as taken along the line V—V of Figure 2;

Figure 6 is a diagrammatic end view of the fender shield and fender illustrating the first wrapping or flexing movement; and, Figure 7 is a diagrammatic plan view of the base edge of the fender shield illustrating the final flexing movement as the fender shield is mounted in place on the fender.

Referring now to the various figures of the drawings, there is illustrated therein a vehicle fender 10 of the high-crown type which is commonly employed on motor vehicles of the present day. Mounted on and detachably secured to the fender 10 is a fender shield 11 which is preferably stream-lined in shape, and designed to harmonize with the vehicle fender 10. The outer downwardly depending side wall of the fender 10 is provided with a substantially semi-circular opening 12 which affords access to the vehicle wheel (not shown) and permits removal of the wheel therethrough. As shown in the drawings, the outer curved edge 13 of the fender shield 11 is neither designed nor shaped to conform to the shape of the wheel access opening 12 of the fender 10, but is arranged to overlap the outer depending side wall of the fender 10 as is clearly shown in Figure 1.

The marginal portion of the fender 10 adjacent the wheel opening 12 is underturned or rolled, as at 14 (see Figure 3), while the base edges 15 and 16 of the fender 10 are underturned or rolled as at 17 (see Figure 5). Secured to the fender 10 above the top of the opening 12 is a supporting pin or button 18, an intermediate portion 19 of the shank of the pin or button 18 being preferably square in cross-section for a reason which will presently appear. The rear extremity of the pin or button 18 is threaded, as at 20, and is arranged to receive a complementary threaded nut 21. The opposite end of the pin or button 18 is provided with a head 22 and spaced rearwardly from the head 22 is an intermediate fixed collar 23. The portion 24 which lies between the head 22 and the intermediate collar 23 is preferably round and is arranged to engage and support the fender shield 11 as will presently be described. The square shank portion 19 extends through a complementary square aperture in the fender 10 and through a reinforcing plate 25 disposed against the rear face of the fender 10. After the button or pin 18 has been passed through the fender 10 and the reinforcing plate 25 and the nut 21 is screwed up tightly thereon, the pin or button assembly 18 is in position to support the fender shield 11.

The fender shield 11 includes a principal panel portion 26 which is provided with an inturned base flange 27 and a curled or turned-back marginal portion 28 around the curved edge 13. Extending substantially vertically across the rear face of the fender shield 11 is a reinforcing bracket or leg 29. The greater part of the reinforcing bracket or leg 29 lies in intimate contact against the rear face of the fender shield 11, but the upper end portion thereof is bent obliquely away from the fender shield 11 as at 30, and then upwardly as at 31, where it terminates adjacent the curled marginal portion 28 of the fender shield 11. The top edge of the upper portion of the bracket 29 is knocked out as at 32 (see Figure 4) to permit tabs 33 to be struck inwardly therethrough to make a tight engagement therewith (see Figure 3). The lower end of the reinforcing bracket or leg 29 is bent rearwardly, as at 34 to lie in intimate contact with the inturned base flange 27 of the fender shield 11. The rearwardly bent portion 34 is riveted or otherwise suitably secured to the base flange 27 of the fender shield 11 as at 35. The upper portion 31 of the reinforcing bracket or leg 29 is provided with a circular aperture or hole 36 which is slightly larger than the maximum overall diameter of the head 22 of the button or pin 18 on the fender 10. Disposed immediately above the circular aperture 36 is a smaller aperture 37, which is of sufficient size to just slip over the circular shank portion 24 of the button or pin 18. The aperture 37 connects with the aperture 36 as is clearly shown in Figure 4 of the drawings.

From a careful inspection of the drawings, it will thus be clear that the fender shield 11 may be vertically supported on the fender 10 by hooking the reinforcing bracket or leg 29 over the head 22 of the button or pin 18 and then lowering the fender shield 11 until the top of the small aperture 37 rests on the shank portion 24 of the supporting pin or button 18. When the fender shield 11 is in this position on the supporting pin or button 18, the inturned base flange 27 is so positioned and arranged that it may be forced under the base edges 15 and 16 of the fender 10 (see Figures 2 and 5).

The fender shield 11 is designed and shaped so that it can be progressively flexed or wrapped into place on the fender 10 as it is mounted thereon. This progressive flexing or wrapping action may best be understood from an examination of the diagrammatic views of the fender and fender shield assembly as shown in Figures 6 and 7 of the drawings. It should be remembered in referring to these two figures that Figure 6 is a diagrammatic end view of the fender shield and fender, the full line showing the fender in an unflexed position and the dotted line view illustrating the fender shield in its flexed position; while Figure 7 is a diagrammatic plan view of the lower edge of the fender shield in which the full line shows the lower edge of the fender shield in an unflexed position while the dotted line shows the lower edge of the fender shield in its flexed position. The two views, namely, Figure 6 and Figure 7, when considered together, illustrate the compound flexing action of the present invention.

The fender shield 11 is shaped and designed so that in an unflexed position it is not possible to seat the fender shield 11 on the fender 10. More specifically, the fender shield 11, when hung on the supporting pin or button 18, is so arranged that its curved edge 13 flares away from the portion of the fender 10 which lies immediately opposite it, it being the furthest away from the fender 10 at its lower corners. In order that the curved edge 13 of the fender shield 11 will engage the fender 10 and be seated tightly thereon, it is necessary to warp the fender shield 11 into place. This action has been termed a progressive flexing or wrapping of the fender shield into place since the curved edge 13 of the fender shield 11 progressively engages the fender 10 from a point in proximity to its top down around both side edges to the lower corners of the fender shield. In addition to the progressive flexing or wrapping of the curved edge 13 of the fender shield 11 into place from the top of the fender shield to the two lower corners thereof, the fender shield 11 is also arranged to be flexed inwardly in a plane transverse to the surface of the fender shield 11. This second flexing action is brought about by applying a force as indicated by the arrow F in Figure 7 to the lower portion of the fender shield 11. This application of force at the point indicated by the arrow F causes the lower edge of the fender shield 11 to be flexed inwardly from the full line position as shown in Figure 7 to the dotted line position shown in Figure 7, and comprises the second movement of the compound flexing action of the fender shield 11 as it is mounted into place on the fender 10. It has been found that a fender shield when flexed in this compound manner as it is mounted on a fender 10 provides an unusually tight and firm fitting with the fender 10 and substantially eliminates all vibration and noise therewith.

In order to retain the fender shield in its compound flexed position, a locking mechanism 38 is provided on the fender shield 11 at the point where the force F is to be applied. The locking mechanism 38 is illustrated as being of the usual key-operated tumbler lock type having an outer head portion 39 and a cylindrical shank portion 40 which is threaded for a short distance as at 41 adjacent the head 39. A nut or washer 42, which is internally threaded for complementary engagement with the threaded portion 41, clamps the locking mechanism 38 in tight mounted engagement on the fender shield 11. Mounted on the fender 10 opposite the cylindrical shank portion 40 of the lock mechanism 38 is a collar 43 having a head portion 44 and a shank portion 45 which is threaded for a short distance adjacent the head 44 as at 46. Welded, or otherwise suitably secured to the rear face of the fender 10, is a threaded collar 47 through which the collar 43 is passed, the threaded portion 46 being threaded into the threaded collar 47. The locking mechanism 38 is provided with the usual radially extensible fingers 48 which engage the rear end of the collar 43 and which may be retracted into the cylindrical shank portion 40 upon operation of the locking mechanism.

To mount the fender shield 11 on the fender 10, it is simply necessary to hook the reinforcing bracket or leg 29 of the fender shield 11 over the supporting button or pin 18 on the fender 10, and then progressively flex the curved edge 13 of the fender shield 11 into place against the outer surface of the fender 10 and finally flex the lower portion of the fender shield 11 in a plane transverse to the plane of the face of the fender shield until the locking mechanism 38 snaps through the collar 43.

To dismount the fender shield 11, the locking mechanism 38 is unlocked and the fender shield 11 is then lifted off the supporting button or pin 18.

While I have shown a key-operated locking mechanism as a means by which the fender shield 11 is held in its compound flexed position, it is to be understood that any form of clamping mechanism for retaining the fender shield in place, whether it be a key-operated locking mechanism or not, so as to hold it in its compound flexed position, may be employed without departing from the spirit and scope of the present invention.

While I have shown a particular embodiment of my invention, it will, of course, be understood that I do not wish to be limited thereto, since many modifications may be made and I, therefore, contemplate by the appended claims to cover all such modifications as fall within the true spirit and scope of my invention.

I claim as my invention:

1. The combination comprising a vehicle body part having a downwardly depending side wall portion provided with a wheel opening therein and a shield mounted on said side wall portion over said opening, said shield being supported and held in position on said side wall portion at its top and being shaped so that in an unflexed position the edge portion of said shield progressively flares away from said side wall portion as it approaches the base thereof and said shield also being shaped so that its lower edge in its unflexed position is bowed outwardly from its mounted position, and means for holding said shield in a compound flexed position on said side wall portion.

2. The combination comprising a vehicle body part having a downwardly depending side wall portion provided with a wheel opening therein and a shield mounted on said side wall portion over said opening, said shield having a curved side wall portion engaging edge and a base edge, means adjacent the top of said shield for detachably supporting and securing said shield on said side wall portion over said opening, said shield being shaped and arranged so that said curved edge of said shield is progressively flexed from the top of said shield towards the two lower corners thereof and so that said base edge of said shield is progressively flexed inwardly as said shield is mounted in desired position on said side wall portion.

3. As an article of manufacture, a shield for disposition over the wheel access opening of a vehicle body part, said shield being shaped and arranged to overlap the opening of said body part a substantial portion at least at one end thereof, said shield having means in proximity to its top for engaging said body part and supporting said shield thereon, and said shield having additional latching means for engaging said body part in close proximity to the opening thereof at a point spaced inwardly a substantial distance from the vehicle body part contacting edge of said shield, said latching means being arranged to place and maintain said shield under stress when said shield is mounted on said body part and being the sole means for retaining the lower part of said fender shield from movement laterally away from said body part.

ARTHUR P. FERGUESON.